No. 885,297. PATENTED APR. 21, 1908.
O. RODMAN.
GRAPPLE.
APPLICATION FILED NOV. 16, 1907.
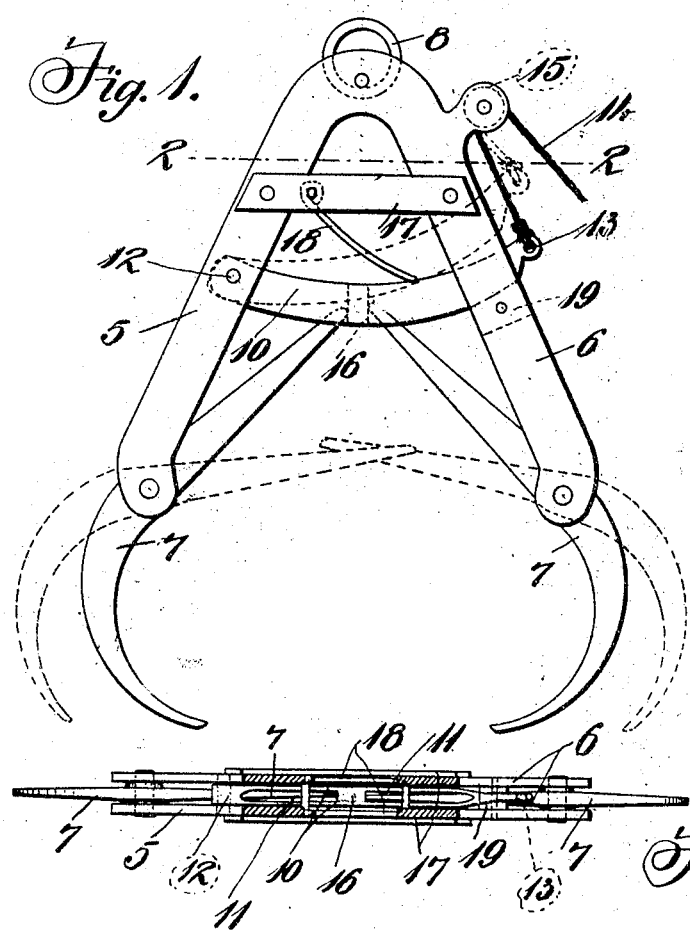
Fig. 1.
Fig. 2.
Fig. 3.
Witnesses
Otto Rodman, Inventor
By Milo B. Stevens & Co., Attorneys

UNITED STATES PATENT OFFICE.

OTTO RODMAN, OF MAXWELL, CALIFORNIA.

GRAPPLE.

No. 885,297. Specification of Letters Patent. Patented April 21, 1908.

Application filed November 16, 1907. Serial No. 402,464.

*To all whom it may concern:*

Be it known that I, OTTO RODMAN, a citizen of the United States, residing at Maxwell, in the county of Colusa and State of California, have invented certain new and useful Improvements in Grapples, of which the following is a specification.

This invention relates to grapples, and more particularly an implement of this kind to be used for loading bales of hay, cotton or other material.

The invention comprises a fork having pivoted tines which grab the bale and are locked in their closed position by a latch which is operable from a distance to trip the bale.

The object of the invention is to provide a grapple of this kind which will readily take bales of different sizes and shapes, and which is simple in construction, reliable in operation, and easily handled.

In the accompanying drawing, Figure 1 is an elevation of the invention. Fig. 2 is a horizontal section on the line 2—2 of Fig. 1. Fig. 3 is a perspective view of a modified form of tine.

Referring specifically to the drawing, 5 and 6 denote the two branches of the fork which are two spaced plates between which, adjacent their extremities, are pivoted the tines 7. At the head of the fork is an eye or other suitable device 8 for attachment to the hoisting-rope. The outer ends of the tines are curved inwardly and pointed as usual so as to enter the baled material.

At 10 is indicated a lever having a slot 11. The lever extends at one end between and is pivoted at 12 to the plates constituting the branch 5 of the fork. The other end of the lever extends between the plates constituting the branch 6 of the fork and has an eye 13 for attachment of the trip-rope 14. The branch 6 carries a pulley 15 over which the trip-rope passes. The inner ends of the tines are adapted to enter the slot 11, and at or about the middle of said slot is secured a block 16 which is in the path of said ends of the tines, whereby they are prevented from swinging open to release the bale. Near the head of the fork, the branches 5 and 6 are connected on both sides by cross bars 17 between which is fastened a spring 18 which presses on the lever 10. Between the plates forming the branch 6 is a stop-block 19 to limit the downward swing of the lever. The latter is normally held pressed against the stop-block by the spring 18.

In use, the lever 10 is swung upwardly as shown by dotted lines in Fig. 1. This releases the tines 7 by removing the block 16 out of the path of their inner ends, thus permitting them to swing open as shown by dotted lines in Fig. 1. The inner ends of the tines are in different planes so that they may pass each other when they swing to this position. After the tines are stuck into the bale, the trip-rope is released and the lever 10 is permitted to swing down so that the inner ends of the tines enter the slot 11, with the block 16 between the tines, whereby they are prevented from swinging down to release the load. The fork is then elevated and upon arriving at the place where the bale is to be dropped, the trip-rope 14 is pulled which swings the lever 10 upwardly and removes the block 16 from the path of the inner ends of the tines 7 whereupon they swing open by the weight of the bale which then drops.

In Fig. 3 is shown a modified form of tine which is intended to be used for loading sacks. The outer end of this tine is widened and shaped so as to hold a sack. Two of these tines, mounted and operated as hereinbefore described, are employed.

A fork constructed as herein described is reliable in operation, it can be easily handled, and it has no complicated parts to get out of order.

I claim:—

1. A grapple comprising a furcate frame, tines pivoted to the branches of said frame, a lever pivoted to the frame, and a stop-block carried by the lever in the path of the inner ends of the tines.

2. A grapple comprising a furcate frame, tines pivoted to the branches of said frame, a lever pivoted to said frame and having a slot to receive the inner ends of the tines, and a stop-block in said slot in the path of the tines.

In testimony whereof I affix my signature, in presence of two witnesses.

OTTO RODMAN.

Witnesses:
 GEO. B. HARDEN,
 GEO. L. HARDEN.